(12) United States Patent
Tanaka et al.

(10) Patent No.: US 8,457,463 B2
(45) Date of Patent: Jun. 4, 2013

(54) BEAM HOMOGENIZER, LASER IRRADIATION APPARATUS, AND METHOD FOR MANUFACTURING SEMICONDUCTOR DEVICE

(75) Inventors: Koichiro Tanaka, Atsugi (JP); Tomoaki Moriwaka, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 187 days.

(21) Appl. No.: 13/116,381

(22) Filed: May 26, 2011

(65) Prior Publication Data

US 2011/0230037 A1     Sep. 22, 2011

Related U.S. Application Data

(60) Division of application No. 12/153,720, filed on May 23, 2008, now Pat. No. 7,953,310, and a continuation of application No. 10/827,449, filed on Apr. 20, 2004, now Pat. No. 7,418,172.

(30) Foreign Application Priority Data

Apr. 24, 2003   (JP) ................................ 2003-120782
Oct. 1, 2003    (JP) ................................ 2003-342803

(51) Int. Cl.
    *G02B 6/10*     (2006.01)
(52) U.S. Cl.
    USPC .......................................... 385/129; 385/33
(58) Field of Classification Search
    None
    See application file for complete search history.

(56) References Cited

U.S. PATENT DOCUMENTS

| 4,733,944 A | 3/1988 | Fahlen et al. |
| 4,744,615 A | 5/1988 | Fan et al. |
| 4,793,694 A | 12/1988 | Liu |
| 4,830,447 A | 5/1989 | Kamiyama et al. |

(Continued)

FOREIGN PATENT DOCUMENTS

| CN | 1448753 | 10/2003 |
| EP | 0 747 772 | 12/1996 |

(Continued)

OTHER PUBLICATIONS

Office Action (Application No. 200410043042.X) Dated Dec. 15, 2006.

(Continued)

*Primary Examiner* — Mike Stahl
(74) *Attorney, Agent, or Firm* — Eric J. Robinson; Robinson Intellectual Property Law Office, P.C.

(57) ABSTRACT

The present invention provides a beam homogenizer being able to form a rectangular beam spot having homogeneous energy distribution in a direction of its major axis without using the optical lens requiring to be manufactured with high accuracy. In addition, the present invention provides a laser irradiation apparatus being able to irradiate the laser beam having homogeneous energy distribution in a direction of its major axis. Furthermore, the present invention provides a method for manufacturing a semiconductor device being able to enhance crystallinity in the surface of the substrate and to manufacture TFT with a high operating characteristic.

The beam homogenizer, one of the present invention, is to shape the beam spot on the surface to be irradiated into a rectangular spot having an aspect ratio of 10 or more, preferably 100 or more, and comprises an optical waveguide for homogenizing the energy distribution of the rectangular beam spot in the direction of its major axis.

30 Claims, 7 Drawing Sheets

U.S. PATENT DOCUMENTS

| | | | |
|---|---|---|---|
| 5,080,474 | A | 1/1992 | Miyamoto |
| 5,224,200 | A | 6/1993 | Rasmussen et al. |
| 5,285,509 | A | 2/1994 | Reeder et al. |
| 5,303,084 | A | 4/1994 | Pflibsen et al. |
| 5,721,416 | A | 2/1998 | Burghardt et al. |
| 5,825,551 | A | 10/1998 | Clarkson et al. |
| 5,886,313 | A | 3/1999 | Krause et al. |
| 5,900,980 | A | 5/1999 | Yamazaki et al. |
| 6,002,523 | A | 12/1999 | Tanaka |
| 6,038,075 | A | 3/2000 | Yamazaki et al. |
| 6,078,652 | A | 6/2000 | Barak |
| 6,104,535 | A | 8/2000 | Tanaka |
| 6,137,633 | A | 10/2000 | Tanaka |
| 6,157,492 | A | 12/2000 | Yamazaki et al. |
| 6,176,926 | B1 | 1/2001 | Tanaka |
| 6,212,012 | B1 | 4/2001 | Tanaka |
| 6,215,595 | B1 | 4/2001 | Yamazaki et al. |
| 6,236,449 | B1 | 5/2001 | Tanitsu |
| 6,239,913 | B1 | 5/2001 | Tanaka |
| 6,285,443 | B1 | 9/2001 | Wangler et al. |
| 6,291,320 | B1 | 9/2001 | Yamazaki et al. |
| 6,304,385 | B1 | 10/2001 | Tanaka |
| 6,310,727 | B1 | 10/2001 | Tanaka |
| 6,388,812 | B2 | 5/2002 | Yamazaki et al. |
| 6,393,042 | B1 | 5/2002 | Tanaka |
| 6,437,284 | B1 | 8/2002 | Okamoto et al. |
| 6,437,313 | B2 | 8/2002 | Yamazaki et al. |
| 6,441,965 | B2 | 8/2002 | Yamazaki et al. |
| 6,563,843 | B1 | 5/2003 | Tanaka |
| 6,573,162 | B2 | 6/2003 | Tanaka et al. |
| 6,587,277 | B2 | 7/2003 | Yamazaki et al. |
| 6,693,257 | B1 | 2/2004 | Tanaka |
| 6,738,129 | B2 | 5/2004 | Mizouchi |
| 6,738,396 | B2 | 5/2004 | Filgas et al. |
| 6,785,304 | B2 | 8/2004 | Filgas |
| 6,818,568 | B2 | 11/2004 | Tanaka |
| 6,856,630 | B2 | 2/2005 | Tanaka |
| 6,856,727 | B2 | 2/2005 | Li |
| 6,943,086 | B2 | 9/2005 | Hongo et al. |
| 6,961,184 | B2 | 11/2005 | Yamazaki et al. |
| 7,071,035 | B2 | 7/2006 | Yamazaki et al. |
| 7,153,359 | B2 | 12/2006 | Maekawa et al. |
| 7,169,630 | B2 | 1/2007 | Moriwaka |
| 7,245,802 | B2 | 7/2007 | Tanaka |
| 7,327,916 | B2 | 2/2008 | Tanaka |
| 7,371,620 | B2 | 5/2008 | Yamazaki et al. |
| 7,594,965 | B2 | 9/2009 | Tanaka |
| 7,868,267 | B2 | 1/2011 | Tanaka |
| 2002/0196551 | A1 | 12/2002 | Yamazaki et al. |

FOREIGN PATENT DOCUMENTS

| | | |
|---|---|---|
| EP | 0 805 368 | 11/1997 |
| EP | 1 063 049 | 12/2000 |
| EP | 1 122 020 | 8/2001 |
| GB | 2 044 948 | 10/1980 |
| JP | 63-137120 | 6/1988 |
| JP | 05-329675 | 12/1993 |
| JP | 07-027993 | 1/1995 |
| JP | 08-327942 | 12/1996 |
| JP | 08-338962 | 12/1996 |
| JP | 09-234579 | 9/1997 |
| JP | 09-275081 | 10/1997 |
| JP | 11-212021 | 8/1999 |
| JP | 2001-007045 | 1/2001 |
| JP | 2001-291681 | 10/2001 |
| JP | 2002-141302 | 5/2002 |
| JP | 2002-184206 | 6/2002 |
| JP | 2003-287703 | 10/2003 |

OTHER PUBLICATIONS

Search Report (Application No. 200402047-5) dated Nov. 17, 2006.

H. Kahlert et al., "High Resolution Optics for Thin Si-film Crystallization Using Excimer Lasers: Present Status and Future Development," SPIE, vol. 5004, May 2003, pp. 20-27.

Computer translation of detailed description, JP 07-027993 (published Jan. 1995).

Kahlert et al., "High Resolution Optics for Thin Si-film Crystallization Using Excimer Lasers: Present Status and Future Development," Poly-Silicon Thin Film Transistor Technology and Applications in Displays and Other Novel Technology Areas, SPIE, vol. 5004, May 2003, pp. 20-27.

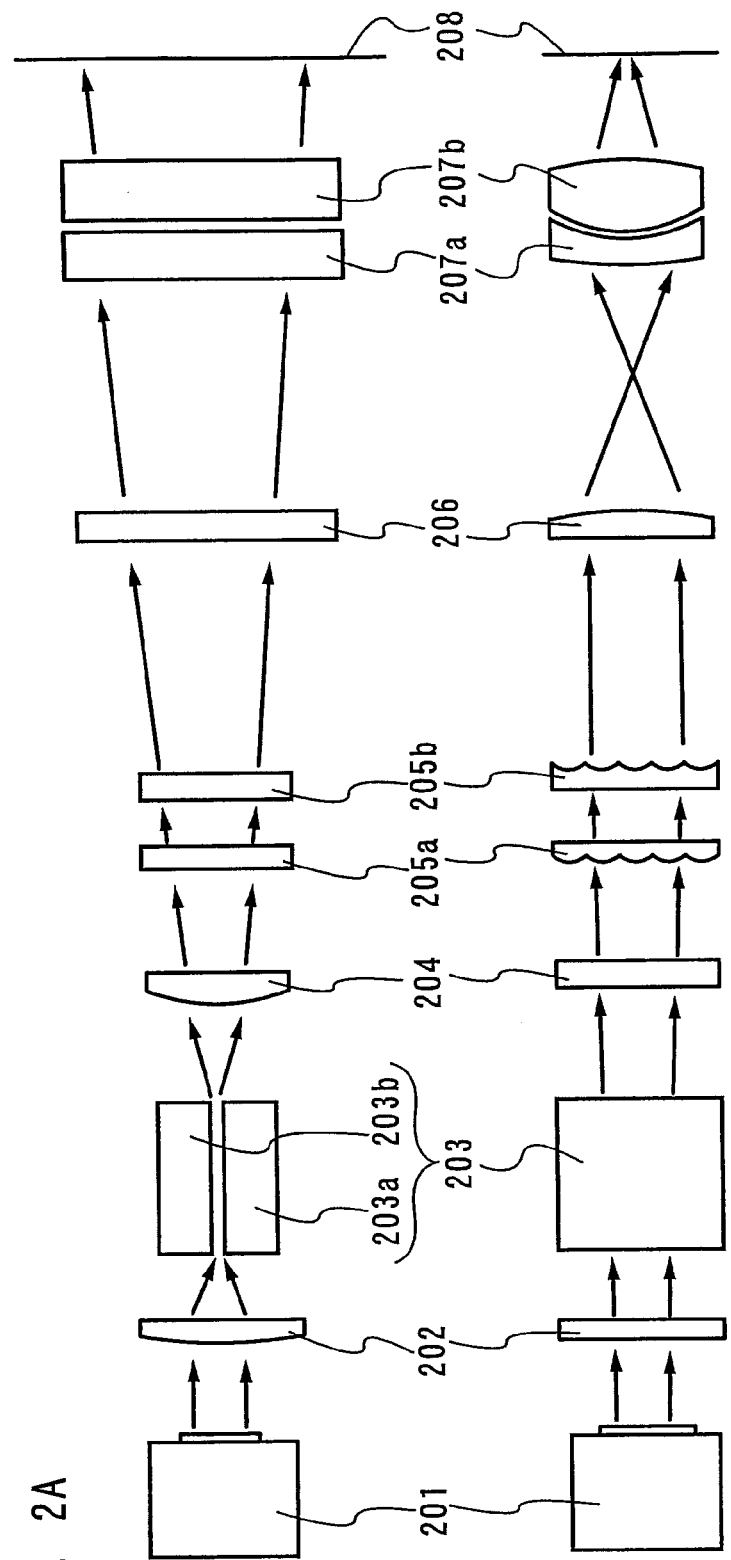

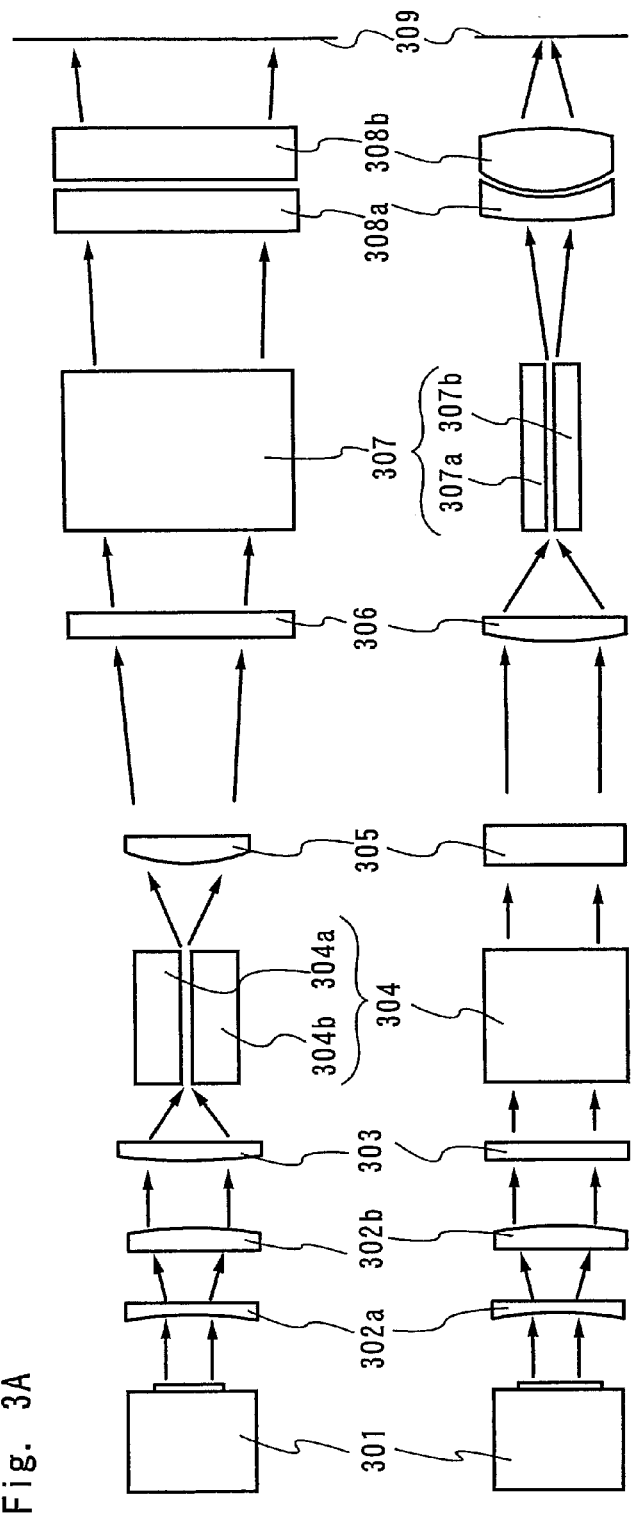

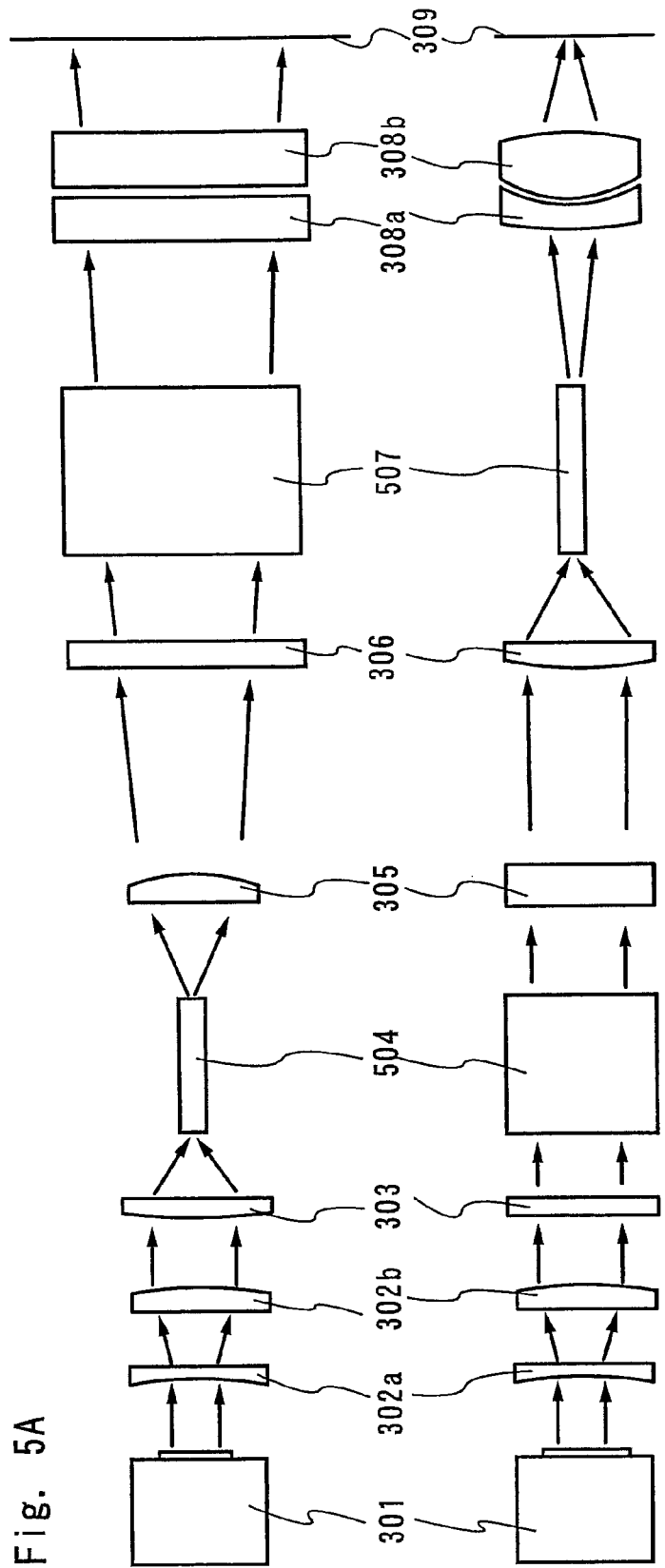

BEAM HOMOGENIZER, LASER IRRADIATION APPARATUS, AND METHOD FOR MANUFACTURING SEMICONDUCTOR DEVICE

BACKGROUND OF THE INVENTION

1. Field of the Invention

The present invention relates to a beam homogenizer for homogenizing a beam spot on a surface to be irradiated in a certain region. The present invention also relates to a laser irradiation apparatus for irradiating the surface to be irradiated with the beam spot. Furthermore, the present invention also relates to a method for manufacturing a semiconductor device using a crystalline semiconductor film formed with the laser irradiation apparatus.

2. Description of the Related Art

In recent years, there has been a technique widely studied for crystallizing or enhancing a crystallinity of an amorphous semiconductor film or a crystalline semiconductor film (a semiconductor film having a crystallinity such as poly-crystal or micro-crystal, which is not single-crystal), that is to say, a semiconductor film which is not single-crystal (referred to as a non-single crystalline semiconductor film) formed over an insulating surface such as a glass substrate with laser annealing performed thereto. A silicon film is often used as the semiconductor film.

In comparison with a quartz substrate that has been used conventionally, the glass substrate has advantages that it is inexpensive and superior in workability, and that it can be processed easily into a large sized substrate. This is the reason why the study has been extensively conducted. The laser is preferably used for crystallization because the glass substrate has a low melting point. The laser can give high energy only to the non-single crystal semiconductor film without changing the temperature of the substrate too much.

The crystalline silicon film formed with the laser annealing has a high mobility. Therefore, a thin film transistor (TFT) formed with this crystalline silicon film is used extensively. For example, the crystalline silicon film is extensively used in a monolithic liquid crystal electro-optical device and the like in which TFT for a pixel and TFT for a driver circuit are formed on one glass substrate. The crystalline silicon film is referred to as a poly-crystalline silicon film or a poly-crystalline semiconductor film because the crystalline silicon film is formed of a number of crystal grains.

In addition, it is possible to shape a laser beam oscillated from a pulsed laser oscillator having high output such as an excimer laser into a square spot with several cm on a side or into a linear spot with 10 cm or more in length (for example, Japanese Patent Publication No. 9-234579). Then the beam spot is moved relative to the surface to be irradiated to perform the laser annealing. Since such a method can enhance productivity and is superior industrially, it is preferably employed.

In particular, when the linear beam spot is employed, unlike a punctate beam spot requiring to be scanned from front to back and from side to side, the linear beam spot can provide high productivity since a large-sized surface can be irradiated by scanning the linear beam spot only in a direction perpendicular to the direction of its major axis. It is noted that the linear beam spot here means a rectangular beam spot having a high aspect ratio. The beam spot is scanned in the direction perpendicular to the direction of the major axis of the linear beam spot because it is the most effective scanning direction. Because of such high productivity, at present, the laser annealing process is mainly employing the linear beam spot obtained by shaping a pulsed excimer laser through an appropriate optical system.

FIGS. 6A and 6B show an example of the optical system for shaping a cross-section of a beam spot into linear on the surface to be irradiated. The optical system shown in FIGS. 6A and 6B is an extremely general optical system. The optical system not only shapes the cross-section of the beam spot into linear but also homogenizes the energy of the beam spot on the surface to be irradiated simultaneously. Generally, the optical system for homogenizing the energy of the beam is referred to as a beam homogenizer. The optical system shown in FIGS. 6A and 6B is also a beam homogenizer.

First, a side view of FIG. 6A is explained. A beam spot of a laser beam oscillated from a laser oscillator 1201 is divided in one direction through cylindrical lens arrays 1202a and 1202b. The direction is referred to as a vertical direction. When a mirror is inserted in the optical system, a beam spot in the vertical direction is bent to the direction bent by the mirror. The laser beam is divided into four beams in this structure. These divided beam spots are combined into one beam spot with a cylindrical lens 1204 once. After the beam spots separated again are reflected on a mirror 1207, the beam spots are converged into one beam spot again with a doublet cylindrical lens 1208 on a surface to be irradiated 1209. A doublet cylindrical lens is a set of lenses consisting of two cylindrical lenses. The configuration of FIGS. 6A and 6B homogenizes the energy distribution of the beam spot shaped into linear in the vertical direction and determines the length thereof in the vertical direction.

Next, a top view of FIG. 6B is explained. The beam spot of a laser beam oscillated from the laser oscillator 1201 is divided in a direction perpendicular to the vertical direction through a cylindrical lens array 1203. The direction perpendicular to the vertical direction is referred to as a horizontal direction. When a mirror is inserted in the optical system, a beam spot in the horizontal direction is bent to the direction bent by the mirror. The beam spot is divided into seven beam spots in this structure. After that, the beam spots divided into seven beam spots are combined into one beam spot on the surface to be irradiated 1209 with a cylindrical lens 1205. A dotted line shows correct optical path and correct positions of the lens and surface to be irradiated in the case not disposing the mirror 1207. The configuration of FIGS. 6A and 6B homogenizes the energy distribution of the beam spot shaped into linear in the horizontal direction and determines the length thereof in the horizontal direction.

As described above, the cylindrical lens arrays 1202a, 1202b, and 1203 are the lenses for dividing the beam spot of the laser beam. The number of the divided beam spots determine the homogeneity of the energy distribution of the obtained linear beam spot.

Each of the lenses is made of quartz in order to correspond with the XeCl excimer laser. In addition, the lenses have coated surfaces thereon so that the laser beam emitted from the excimer laser transmits through the lenses very much. This makes transmittance of the excimer laser beam become 99% or more per one lens.

The linear beam spot processed through the above lenses is irradiated as being overlapped in such a way that the linear beam spot is displaced gradually in the direction of the minor axis of the linear beam spot. With such irradiation performance, the laser annealing can be conducted to the whole surface of the non-single crystal silicon film, for example, so as to crystallize it or to enhance its crystallinity.

Next, a typical method for manufacturing a semiconductor film, which becomes an object to be irradiated by the laser beam, is shown. Initially, a glass substrate having a thickness of 0.7 mm and a length of 5 inch on a side is used. A $SiO_2$ film (a silicon oxide film) is formed over the substrate in 200 nm thick with a plasma-CVD apparatus, and an amorphous silicon film (hereinafter referred to as a-Si film) is formed over a surface of the $SiO_2$ film in 50 nm thick. When the substrate is exposed to the atmosphere of nitrogen at a temperature of 500° C. for one hour, hydrogen concentration in the film is decreased. The resistivity of the film is considerably increased against the laser beam.

A XeCl excimer laser (wavelength 308 nm, pulse width 30 ns) is used as the laser oscillator. A spot size of the laser beam is 15 mm×35 mm at the laser beam window (both are width at half maximum). The laser beam window is defined as a plane perpendicular to the traveling direction of the laser beam just after the laser beam is emitted from the laser oscillator.

The laser beam emitted from the excimer laser usually has a rectangular shape, and when it is expressed with an aspect ratio, the rectangular beam has an aspect ratio ranging from 1 to 5 approximately. The laser beam has Gaussian energy distribution in which the intensity of the laser beam becomes higher toward the center thereof. The beam spot of the laser beam is changed into a linear beam spot having homogeneous energy distribution and having a size of 300 mm×0.4 mm through the optical system shown in FIGS. 6A and 6B.

When the laser beam is irradiated to the semiconductor film, about 1/10 of the minor width (width at half maximum) of the linear beam spot is the most appropriate pitch for overlapping the laser beam. The homogeneity of the crystallinity in the semiconductor film can be improved. In the above example, since the minor width is 0.4 mm, the laser beam is irradiated under the condition of the excimer laser in which the pulse frequency is set to 300 Hz, and the scanning speed is set to 10 mm/s. On this occasion, the energy density of the laser beam on the surface to be irradiated is set to 450 mJ/cm². The method described above is a very general method for crystallizing the semiconductor film with the linear laser beam.

The cylindrical lens requires to be manufactured with high accuracy.

The cylindrical lens array is the lens with cylindrical lenses arranged in a direction of its curvature. Here, the direction of the curvature is defined as a direction perpendicular to a generating line of a cylindrical surface of the cylindrical lens. The cylindrical lens array always has a joint between the cylindrical lenses constituting the cylindrical lens array. Since the joint does not have a curvature as the cylindrical lens, the laser beam being incident into the joint is transmitted without being influenced by the cylindrical lens. The laser beam reaching the surface to be irradiated without being influenced by the cylindrical lens may cause inhomogeneity of the energy distribution of the rectangular beam spot on the irradiated surface.

In addition, all the cylindrical lenses constituting the cylindrical lens array must be manufactured with the same accuracy. When the cylindrical lens has a different curvature, the laser beams divided by the cylindrical lens array are not overlapped on the same position in the surface to be irradiated even with a converging lens. In other words, the region where the energy is attenuated in the rectangular beam spot on the irradiated surface increases. This causes the lowering of the energy usability.

The cause of the inhomogeneous energy distribution of the beam spot on the irradiated surface lies in the structural problem and the manufacturing accuracy of the cylindrical lens array constituting the optical system. More specifically, one of the reasons of the inhomogeneous energy distribution is that all the laser beams divided by the cylindrical lens array are not overlapped on the same position.

Furthermore, when the semiconductor film is irradiated and scanned with the rectangular beam spot having inhomogeneous energy distribution in the direction of its major axis on the surface to be irradiated, the crystallinity of the semiconductor film becomes inhomogeneous in a reflection of the inhomogeneous energy distribution. The inhomogeneity of the crystallinity is synchronized with the inhomogeneity of the characteristic of the semiconductor film such as the mobility. For example, the inhomogeneous crystallinity appears as a variation of an electric characteristic of the TFT comprising the semiconductor film, and displays light and shade pattern on a panel comprising the TFT.

The present invention is made in view of the above problem. The present invention provides a beam homogenizer being able to form a rectangular beam spot having homogeneous energy distribution in the direction of its major axis on the irradiated surface without using the optical lens that is necessary to be manufactured with high accuracy. In addition, the present invention provides a laser irradiation apparatus being able to irradiate a laser beam having a beam spot with homogeneous energy distribution in the direction of its major axis. Furthermore, the present invention provides a method for manufacturing a semiconductor device, being able to enhance the crystallinity of a semiconductor film and to manufacture a TFT with high operating characteristic.

SUMMARY OF THE INVENTION

The present invention employs an optical waveguide as the optical system for homogenizing the energy distribution of the rectangular beam spot in the direction of its major axis on the irradiated surface in the optical system for forming the rectangular beam spot. The optical waveguide is a circuit being able to keep radiation light in a certain region and to transmit the radiation light in such a way that the energy flow thereof is guided in parallel with an axis of the channel.

The present invention provides a beam homogenizer for shaping a beam spot into a rectangular beam spot having an aspect ratio of 10 or more, preferably 100 or more, on an irradiated surface, comprising an optical waveguide for homogenizing the energy distribution of the rectangular beam spot in the direction of its major axis.

In the present invention, the reason why the optical waveguide is used in the beam homogenizer is explained as follows. When the laser beams are incident into the optical waveguide, the laser beams are reflected in the optical waveguide repeatedly and are led to the exit. In other words, the laser beams being incident into the optical waveguide are overlapped as if the incident laser beams are folded on the exit surface, which is the same position. Therefore, the energy distribution of the laser beams is homogenized in the exit surface, on which the laser beams are overlapped, since the laser beams being incident into the optical waveguide obtains the similar effect to case that that the divided laser beams are overlapped on the same position.

The present invention also provides a beam homogenizer for shaping a laser beam into a rectangular beam spot having an aspect ratio of 10 or more, preferably 100 or more, on an irradiated surface. The beam homogenizer comprises an optical waveguide for homogenizing the energy distribution of the rectangular beam spot in a direction of its major axis, and one cylindrical lens or a plurality of cylindrical lenses for converging the light emitted from the optical waveguide in the direction of its major axis on the irradiated surface.

The present invention also provides a beam homogenizer for shaping a laser beam into a rectangular beam spot having an aspect ratio of 10 or more, preferably 100 or more, on an irradiated surface. The beam homogenizer comprises means for homogenizing energy distribution of the rectangular beam spot in the direction of its minor axis, and an optical waveguide for homogenizing the energy distribution of the rectangular beam spot in a direction of its major axis, wherein the means has at least a cylindrical lens array.

The present invention also provides a beam homogenizer for shaping a beam spot into a rectangular beam spot having an aspect ratio of 10 or more, preferably 100 or more, on an irradiated surface. The beam homogenizer comprises an optical waveguide for homogenizing the energy distribution of the rectangular beam spot in a direction of its major axis, and an optical waveguide for homogenizing the energy distribution of the rectangular beam spot in a direction of its minor axis.

In the above structure of the beam homogenizer in the present invention, the optical waveguide has a pair of reflection planes provided oppositely.

In addition, a light pipe can be used as the optical waveguide. The light pipe is formed of circular cone, pyramidal shape, column, prism, or the like, which transmits the light from one end to the other end by the reflection. In addition, the light may be transmitted by a mirror, and a pair of reflection planes provided oppositely may be employed, for example.

The present invention provides a laser irradiation apparatus for shaping a beam spot into a rectangular beam spot having an aspect ratio of 10 or more, preferably 100 or more, on an irradiated surface. The laser irradiation apparatus comprises a laser oscillator and a beam homogenizer, wherein the beam homogenizer comprises an optical waveguide for homogenizing the energy distribution of the rectangular beam spot in a direction of its major axis.

The present invention also provides a laser irradiation apparatus for shaping a beam spot into a rectangular beam spot having an aspect ratio of 10 or more, preferably 100 or more, on an irradiated surface. The laser irradiation apparatus comprises a laser oscillator and a beam homogenizer, wherein the beam homogenizer comprises an optical waveguide for homogenizing the energy distribution of the rectangular beam spot in a direction of its major axis and an optical waveguide for homogenizing the energy distribution of the rectangular beam spot in a direction of its minor axis.

In the above structure of the laser irradiation apparatus in the present invention, the optical waveguide has a pair of reflection planes provided oppositely.

In addition, a light pipe can be used as the optical waveguide.

In the above structure of the laser irradiation apparatus in the present invention, the laser oscillator is selected from the group consisting of an excimer laser, a YAG laser, a glass laser, a $YVO_4$ laser, a $GdVO_4$ laser, a YLF laser, and an Ar laser.

In the above structure of the laser irradiation apparatus in the present invention, the laser irradiation apparatus comprises a moving stage for moving the object to be irradiated relative to the beam spot and further comprises a transferring apparatus for transferring the object to be irradiated to the moving stage.

The present invention provides a method for manufacturing a semiconductor device comprising the steps of forming a non-single crystal semiconductor film over a substrate, and performing laser annealing to the non-single crystal semiconductor film with a laser beam while moving a position of the beam spot relative to the non-single crystal semiconductor film, assuming that the non-single crystal semiconductor film is the surface to be irradiated. The laser beam is generated in a laser oscillator and then shaped into a rectangular beam having an aspect ratio of 10 or more, preferably 100 or more, and has homogeneous energy distribution through a cylindrical lens array and an optical waveguide. The cylindrical lens array acts upon the rectangular beam spot in a direction of its minor axis, and the optical waveguide acts upon the rectangular beam spot in a direction of its major axis.

The present invention also provides a method for manufacturing a semiconductor device comprising the steps of forming a non-single crystal semiconductor film over a substrate, and performing laser annealing to the non-single crystal semiconductor film with a laser beam while moving a position of the beam spot relative to the non-single crystal semiconductor film, assuming that the non-single crystal semiconductor film is the surface to be irradiated. The laser beam is generated in a laser oscillator and then shaped into a rectangular beam having an aspect ratio of 10 or more, preferably 100 or more, and has homogeneous energy distribution through a plurality of optical waveguides. At least one of the plurality of optical waveguides acts upon the rectangular beam spot in a direction of its major axis, and at least one of the plurality of optical waveguides acts upon the rectangular beam spot in a direction of its minor axis.

In addition, a light pipe can be used as the optical waveguide.

In the above structure of the method for manufacturing a semiconductor device in the present invention, the laser oscillator is selected from the group consisting of an excimer laser, a YAG laser, a glass laser, a $YVO_4$ laser, a $GdVO_4$ laser, a YLF laser, and an Ar laser.

ADVANTAGEOUS EFFECT OF THE INVENTION

The present invention provides a laser irradiation apparatus comprising a beam homogenizer equipped with an optical waveguide. The optical waveguide comprises a pair of reflection planes provided oppositely being able to homogenize the energy distribution of the rectangular beam spot in a direction of its major axis on the irradiated surface.

When the beam homogenizer for forming a rectangular beam spot with the optical waveguide disclosed in the present invention is used, it becomes possible to form the rectangular beam spot having homogeneous energy distribution in a direction of its major axis on the irradiated surface without using the optical lens that requires to be manufactured with high accuracy. In addition, the optical waveguide is more preferable since it acts upon the rectangular beam spot in a direction of its minor axis and can also homogenize the energy distribution in the direction thereof on the irradiated surface. When the rectangular beam spot emitted from the laser irradiation apparatus with the use of this beam homogenizer is scanned on the semiconductor film in a direction of its minor axis, the inhomogeneous crystallinity due to the inhomogeneous energy distribution of the beam spot can be suppressed, and the homogeneity of the crystallinity in the semiconductor film can be enhanced. In addition, when the present invention is applied to a mass-production line of a low-temperature poly-crystalline silicon TFT, it is possible to manufacture TFT having uniform high operating characteristic. Furthermore, when the low-temperature poly-crystalline silicon is applied to a liquid crystal display device or a light-emitting device with the use of a light-emitting element, it becomes possible to manufacture a display device having very few display unevenness.

BRIEF DESCRIPTION OF THE DRAWINGS

In the accompanying drawings:

FIGS. 2A and 2B are drawings showing an example of a beam homogenizer with the use of the optical waveguide disclosed in the present invention.

FIGS. 3A and 3B are drawings showing an example of a beam homogenizer with the use of the optical waveguide disclosed in the present invention.

FIGS. 5A and 5B are drawings showing an example of beam homogenizer with the use of the optical waveguide disclosed in the present invention.

EMBODIMENT MODE OF THE INVENTION

Figure 1A:
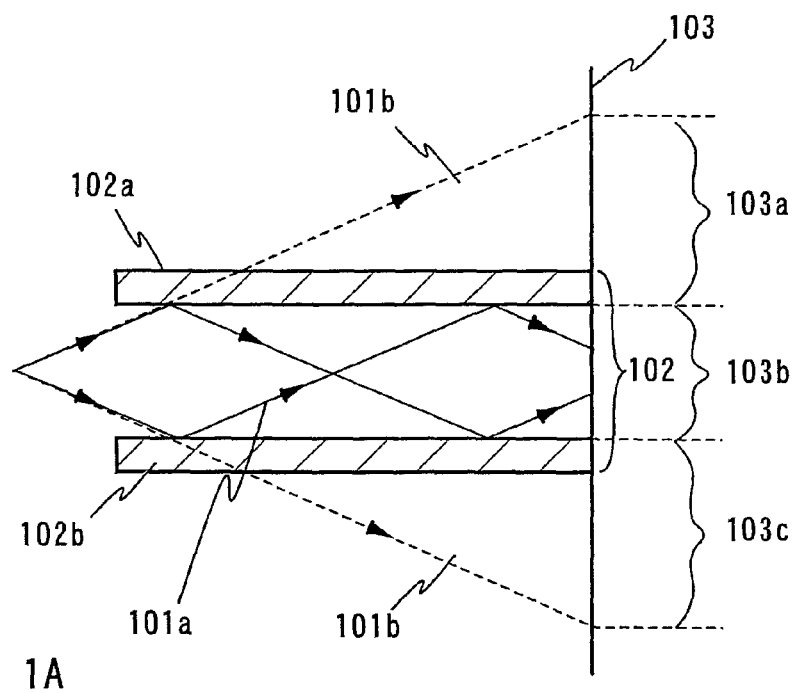
FIGS. 1A and 1B are drawings to explain homogenization of the energy distribution of the beam spot by the optical waveguide.
Figure 1B:
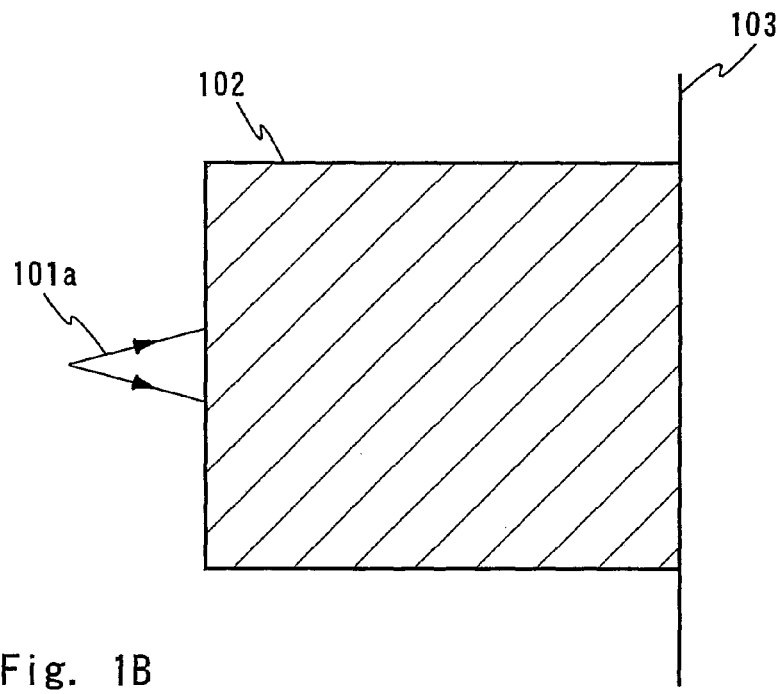

First, a method for homogenizing the energy distribution of the beam spot with the use of the optical waveguide is explained in reference to FIGS. 1A and 1B. Initially, a top view of FIG. 1A is explained. An optical waveguide 102 having a pair of reflection planes 102a and 102b provided oppositely, and a surface to be irradiated 103 are prepared, and a laser beam is made incident from left side on paper. When there is the optical waveguide 102, the laser beam is drawn with a continuous line 101a. When there is not the optical waveguide 102, the laser beam is drawn with a dotted line 101b. When there is not the optical waveguide 102, the laser beam being incident from left side on paper reach regions 103a, 103b and 103c in a surface to be irradiated 103 as indicated with a dotted line 101b.

On the other hand, when there is the optical waveguide 102, as indicated with the laser beam 101a, the laser beam is reflected by the reflection planes of the optical waveguide 102 and all the rays reach the region 103b in the surface to be irradiated 103. In other words, all the laser beams that reach the regions 103a and 103c in the case that the optical waveguide 102 is not provided reach the region 103b in the surface to be irradiated 103 in the case that the optical waveguide 102 is provided. Thus, when the laser beams are made incident into the optical waveguide 102, the laser beams are reflected repeatedly and are led to the exit. That is to say, the laser beams are overlapped as if the incident laser beams are folded on the region 103b in the surface to be irradiated 103, which is the same position. In this example, the length of the total divergence of the laser beams 103a, 103b, and 103c on the surface to be irradiated 103 when there is not the optical waveguide is defined as A, and the length of the laser beam divergence 103b on the surface to be irradiated 103 when there is the optical waveguide is defined as B. Then, A/B corresponds to the number of laser beams divided by the homogenizer described in the related art. Thus, when the incident ray is divided and all the divided laser beams are overlapped on the same position, the energy distribution of the laser beam is homogenized on the overlapped position.

Usually, the more the homogenizer divides the laser beam, the more homogeneous the energy distribution becomes on the position where the divided laser beams are overlapped. The number of the laser beams divided by the optical waveguide 102 can be increased when the laser beam is reflected more times in the optical waveguide 102. In other words, the length of a pair of reflection planes of the optical waveguide in the direction to which the laser beams are incident may be made longer. In addition, the number of divided laser beams can be increased by narrowing the space between the reflection planes provided oppositely, or by enhancing NA (numerical aperture) of the laser beam being incident into the optical waveguide.

The optical system for forming a rectangular beam spot including a beam homogenizer disclosed in the present invention is explained with reference to FIGS. 2A and 2B. In a top view of FIG. 2A, the direction perpendicular to the paper is the direction of the minor axis of the rectangular beam spot. Hereinafter, a light pipe can be used as the optical waveguide.

First, the top view of FIG. 2A is explained. A laser beam emitted from a laser oscillator 201 is propagated to the direction indicated by an arrow in FIGS. 2A and 2B and then the laser beam is incident into a cylindrical lens 202. The laser beam is focused through the cylindrical lens 202 in the direction of the major axis of the rectangular beam spot and then is incident into an optical waveguide 203 having a pair of reflection planes 203a and 203b provided oppositely. The laser beam being incident into the optical waveguide 203 is reflected repeatedly in the optical waveguide 203 and is led to the exit. A plane having homogeneous energy distribution in the direction of the major axis of the rectangular beam spot is formed at the exit of the optical waveguide 203. For example, the optical waveguide 203 may have a length of 300 mm in the direction to which the laser beam is incident, and a distance of 2 mm between the reflection planes.

The longer the length of the optical waveguide 203 in the direction to which the laser beam is incident is, or the shorter the focal length of the cylindrical lens 202 is, the more homogeneous the energy distribution becomes. However, the actual system must be manufactured in consideration of the size of the optical system, and thereby the length of the optical waveguide and the focal length of the cylindrical lens must be practical in accordance with the size of the system.

A cylindrical lens 204 projects the beam spot having homogeneous energy distribution in the direction of the major axis of the rectangule formed at the exit of the optical waveguide 203 to a surface to be irradiated 208, through cylindrical lens array 205a, 205b and cylindrical lenses 206, 207a, and 207b. In other words, the beam spot having homogeneous energy distribution and the surface to be irradiated 208 are conjugated with respect to the doublet cylindrical lens 204. This homogenizes the energy distribution of the rectangular beam spot in the direction of its major axis and determines the length thereof in the direction of its major axis.

The present invention having the optical waveguide 203 can remedy the structural problem and the problem of the manufacturing accuracy of the cylindrical lens array, and the problem of the manufacturing accuracy of the cylindrical lens for converging the divided beams, which cause the inhomogeneous energy distribution of the rectangular beam spot on the surface to be irradiated in the conventional optical system.

Next, a side view of FIG. 2B is explained. The laser beam emitted from the laser oscillator 201 is divided through cylindrical lens arrays 205a and 205b in the direction of the minor axis of the rectangular beam spot. The laser beams divided by the cylindrical lens arrays 205a and 205b are overlapped on the same surface by a cylindrical lens 206 to homogenize the energy distribution of the rectangular beam spot in the direction of its minor axis.

A beam spot having homogeneous energy distribution in the direction of the minor axis of the rectangule formed by the cylindrical lens 206 is projected to the surface to be irradiated 208 through a doublet cylindrical lens consisting of cylindrical lenses 207a and 207b. Thus, the energy distribution of the rectangular beam spot is homogenized in the direction of its minor axis on the surface to be irradiated 208, and the length thereof in the direction of its minor axis is determined. The doublet cylindrical lens does not need to be employed, but when the doublet cylindrical lens is employed, spatial margin can be given because a certain degree of distance can be secured between the optical system and the surface to be irradiated. It is noted that when the homogeneity of the beam spot on the surface to be irradiated is not required too much, or when F-number (focal length/aperture ratio) of the doublet cylindrical lens is extremely high, a singlet cylindrical lens may be employed.

With the optical system explained above, it is possible to form the rectangular beam spot having homogeneous energy distribution in the directions of its major axis and its minor axis on the irradiated surface.

The laser oscillator to be combined with the optical system for forming the rectangular beam spot and including the homogenizer disclosed in the present invention preferably has high output and the wavelengths that can be sufficiently absorbed in the semiconductor film. When a silicon film is employed as the semiconductor film, the wavelength of the laser beam emitted from the laser oscillator is preferably not longer than 600 nm in consideration of the absorption ratio. For example, there are an excimer laser, a YAG laser (harmonic), and a glass laser (harmonic) given as the laser oscillator emitting such wavelengths.

In addition, there are a $YVO_4$ laser (harmonic), a $GdVO_4$ laser (harmonic), a YLF laser (harmonic), and an Ar laser given as the laser oscillator emitting an appropriate wavelength for crystallizing the silicon film.

Hereinafter, a method for manufacturing a semiconductor device of the present invention by using the beam homogenizer and the laser irradiation apparatus of the present invention is explained. First, a substrate having a size of 600 mm×720 mm×0.7 mm is prepared as the substrate, for example. A no-alkali glass substrate having enough resistance against the heat up to 600° C. such as an aluminoborosilicate glass, a bariumborosilicate glass or an aluminosilicate glass can be used as this substrate. A silicon oxide film is formed in 200 nm thick over the glass substrate as a base film. Moreover, an amorphous silicon film is formed over the base film in 55 nm thick. These films are formed with sputtering. They may be formed with plasma-CVD alternatively.

The substrate with the films formed thereon is put in an atmosphere of nitrogen at a temperature ranging from 450 to 500° C. for 1 to 3 hours. This process is to reduce hydrogen concentration in the amorphous silicon film. This process is performed since the film cannot resist against the laser energy when the amorphous silicon film contains too much hydrogen. The hydrogen concentration in the amorphous silicon film is appropriate on the order of $10^{20}$ atoms/cm³. Here, $10^{20}$ atoms/cm³ means that $10^{20}$ hydrogen atoms exist in 1 cm³.

For example, in this embodiment mode, a XeCl excimer laser is used as the laser oscillator. In this embodiment, the XeCl excimer laser (wavelength 308 nm, pulse width 30 ns) STEEL 1000 manufactured by Lambda Physik, Inc. is employed. The excimer laser is a pulsed laser. The excimer laser has a maximum energy of 1000 mJ per a pulse, a wavelength of 308 nm, and a maximum frequency of 300 Hz. When the energy of the pulsed laser light fluctuates within ±10%, preferably within ±5%, in every pulse during the laser irradiation to one substrate, homogeneous crystallization can be performed.

The energy fluctuation of the laser light described above is defined as follows. In other words, the average value of the laser energy in the period of the irradiation to one substrate is assumed to be standard. Then, the fluctuation of the laser energy is defined as the value expressing the difference between the average value and the minimum value in the period of the irradiation or the difference between the average value and the maximum value in the period of the irradiation.

In addition, the XeCl excimer laser (wavelength 308 nm, pulse width 170 ns) VEL 1520 manufactured by Sopra, Inc. may be also employed as the laser oscillator. The excimer laser has a maximum energy of 15 J per a pulse and a frequency of 20 Hz. Since the energy fluctuation of the pulsed laser light of the excimer laser can be suppressed within ±2.5% in every pulse during the laser irradiation to one substrate, homogeneous crystallization can be performed. In addition, when the optical system including the optical waveguide of the present invention is employed, the position of the beam spot on the irradiated surface is not affected by the fluctuation of the laser beam at all. Therefore, when the optical waveguide is used in combination with the laser oscillator having extremely stable output such as VEL 1520, it is possible to perform very uniform laser annealing.

The laser beam is irradiated, for example, while scanning the stage with the surface to be irradiated 208 shown in FIGS. 2A and 2B mounted thereon in the direction of the minor axis of the rectangular beam spot. On this occasion, a practitioner may decide the energy density and the scanning speed of the beam spot on the surface to be irradiated appropriately. The energy density may be appropriate in the range of 200 mJ/cm² to 1000 mJ/cm². It is feasible to perform laser annealing homogeneously when the scanning speed is selected in the range where the width of the rectangular beam spot in the direction in its minor axis is overlapped one another by about 90% or more. The optimum scanning speed depends upon the frequency of the laser oscillator, and it may be regarded to be proportional to the frequency thereof.

In this way, the laser annealing process is completed. When such an operation is performed repeatedly, many substrates can be processed. In addition, when a substrate holder being able to store a plurality of substrates and a transferring apparatus for transferring the plurality of substrates automatically between the substrate holder and the stage are prepared, substrates can be processed more effectively. For example, an active matrix liquid crystal display device can be manufactured using the substrate according to a known method.

The excimer laser is used as the laser oscillator in the above example. The excimer laser is appropriate for the optical system in the example because it has a coherent length as short as several μm. Some of the lasers shown below emit a laser beam having a long coherent length. In the case of using such a laser, when the divided beams are combined in such a way that they have optical path difference one another before being combined, it is possible to suppress the interference. Alternatively, the coherent length may be changed intentionally by making the laser beam transmit through an optical fiber or the like before the laser beam is incident into the optical system and then the laser beam may be incident into the beam homogenizer. It is also preferable to employ a harmonic of the YAG laser or a harmonic of the glass laser because they can output high energy similarly and they emit the laser beam sufficiently absorbed in the semiconductor film. There are a YVO$_4$ laser (harmonic), a GdVO$_4$ laser (harmonic), a YLF laser (harmonic), and an Ar laser given as the other appropriate laser oscillator for crystallizing the silicon film. These laser beams have wavelengths sufficiently absorbed in the silicon film.

Although the above example uses the amorphous silicon film as the non-single crystal semiconductor film, it is easily supposed that the present invention can be applied to the other non-single crystal semiconductor. For example, a compound semiconductor film having an amorphous structure such as an amorphous silicon germanium film may be used as the non-single crystal semiconductor film. A poly-crystalline silicon film may be used as the non-single crystal semiconductor film alternatively.

[Embodiment 1]

FIGS. 3A and 3B show an example of the optical system including an optical waveguide to be explained in this embodiment. A light pipe can be used as the optical waveguide. First, a top view of FIG. 3A is explained. A laser beam emitted from a laser oscillator 301 is propagated to the direction indicated by an arrow in FIGS. 3A and 3B. In the top view of FIG. 3A, the direction perpendicular to the paper is the direction of the minor axis of the rectangular beam spot.

Initially, the laser beam is expanded by spherical lenses 302a and 302b. When a laser oscillator 301 emits a sufficiently large beam spot, such a structure is not necessary. It is noted that the optical system for expanding the shape of the beam spot such as the spherical lenses 302a and 302b is generally referred to as a beam expander.

The laser beam expanded by the beam expander is focused in the direction of the major axis of the rectangular beam spot through a cylindrical lens 303 having a thickness of 20 mm with the first surface having a radius of curvature of 194.25 mm and the second surface being plane. The sign of the radius of curvature is positive when the center of the curvature is on the side where the beam is emitted with respect to the lens surface. The sign is negative when the center of the curvature is on the side where the beam is incident with respect to the lens surface. In addition, it is noted that a lens surface where the laser beam is incident is defined as the first surface, and a lens surface where the laser beam is emitted is defined as the second surface.

An optical waveguide 304 including a pair of reflection planes 304a and 304b provided oppositely is arranged in such a way that the entrance of the optical waveguide 304 is positioned in the focal point of a cylindrical lens 303. The laser beam being incident into the optical waveguide 304 is reflected repeatedly in the optical waveguide 304 so as to homogenize the energy distribution thereof and then the laser beam is led to the exit. A plane having homogeneous energy distribution in the direction of the major axis of the rectangular beam spot is formed at the exit of the optical waveguide 304. The optical waveguide 304 has a length of 200 mm in the direction to which the laser beam travels, and a distance of 2 mm between the reflection planes.

A cylindrical lens 305 has a thickness of 5 mm with the first surface having a radius of curvature of 9.7 mm and the second surface being plane, which is positioned 20 mm behind the exit of the optical waveguide 304. The beam spot having homogeneous energy distribution in the direction of the major axis of the rectangule formed at the exit of the optical waveguide 304 is projected by the cylindrical lens 305, an irradiated surface 309 positioned 3600 mm behind the cylindrical lens 305. In other words, the beam spot having homogeneous energy distribution in the direction of the major axis and the surface to be irradiated 309 are conjugated with respect to the cylindrical lens 305. This homogenizes the energy distribution of the rectangular beam spot in the direction of its major axis and determines the length thereof in the direction of its major axis. In this embodiment, the cylindrical lens 305 is employed as the lens for projecting the laser beam emitted from the optical waveguide 304 to the surface to be irradiated 309. In order to reduce aberration more, however, a doublet cylindrical lens is also applicable. The doublet cylindrical lens is a set of lenses consisting of two cylindrical lenses. A set of lenses consisting of three or more lenses may be also used alternatively. The number of lenses may be determined in accordance with the designed system or required specification.

Next, a side view of FIG. 3B is explained. The laser beam emitted from the laser oscillator 301 is expanded through the beam expander including the spherical lenses 302a and 302b. The laser beam expanded through the beam expander is focused in the direction of the minor axis of the rectangular beam spot through a cylindrical lens 306 having a thickness of 20 mm, with the first surface having a radius of curvature of 486 mm and the second surface being plane, which is positioned 773.2 mm behind the cylindrical lens 305.

An optical waveguide 307 having a pair of reflection planes 307a and 307b provided oppositely is arranged in such a way that the entrance of the optical waveguide 307 is positioned in the focal point of the cylindrical lens 306. The laser beam being incident into the optical waveguide 307 is reflected repeatedly in the optical waveguide 307 so as to homogenize the energy distribution thereof and then the laser beam is led to the exit. A plane having homogeneous energy distribution in the direction of the minor axis of the rectangular beam spot is formed at the exit of the optical waveguide 307. The optical waveguide 307 has a length of 250 mm in the direction to which the laser beam travels, and a distance of 2 mm between the reflection planes.

A doublet cylindrical lens 308a and 308b arranged in the position 1250 mm behind the exit of the optical waveguide 307 projects the beam spot having homogeneous energy distribution in the direction of the minor axis of the rectangule formed at the exit of the optical waveguide 307 to the surface to be irradiated 309 positioned 237 mm behind the doublet cylindrical lens.

One cylindrical lens constituting the doublet cylindrical lens has the first surface having a radius of curvature of 125 mm, the second surface having a radius of curvature of 77 mm and has a thickness of 10 mm. The other cylindrical lens has the first surface having a radius of curvature of 97 mm, the second surface having a radius of curvature of −200 mm and has a thickness of 20 mm. The two cylindrical lenses are arranged to have a distance of 5.5 mm in between. Thus, the energy distribution of the rectangular beam spot is homogenized in the direction of its minor axis and determines the length thereof in the direction of its minor axis. The surface to be irradiated may be arranged just after the optical waveguide 307 without using the doublet cylindrical lens, but when the doublet cylindrical lens is employed, spatial margin can be given because a certain degree of distance can be secured between the optical system and the surface to be irradiated.

Figure 4A:
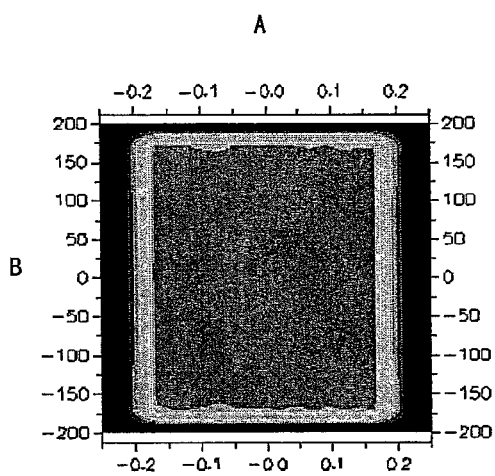
FIGS. 4A to 4C show the energy distribution of the rectangular beam spot obtained by the beam homogenizer shown in FIGS. 3A and 3B.
Figure 4B:
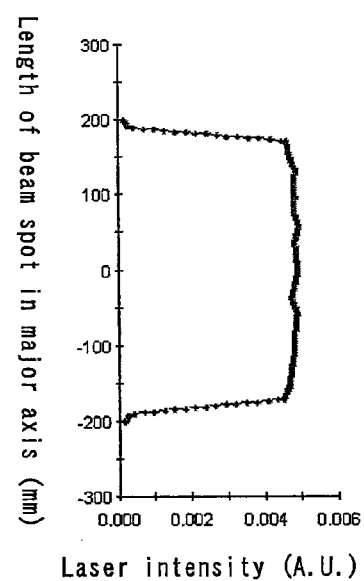
Figure 4C:
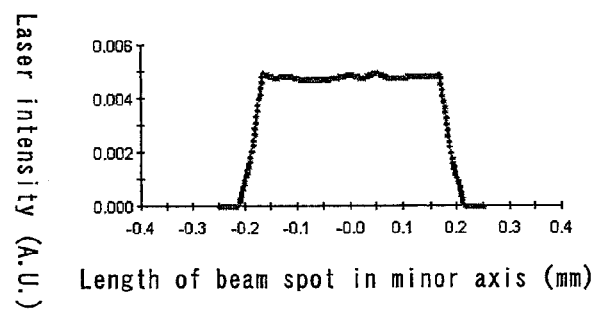
Figure 6A:
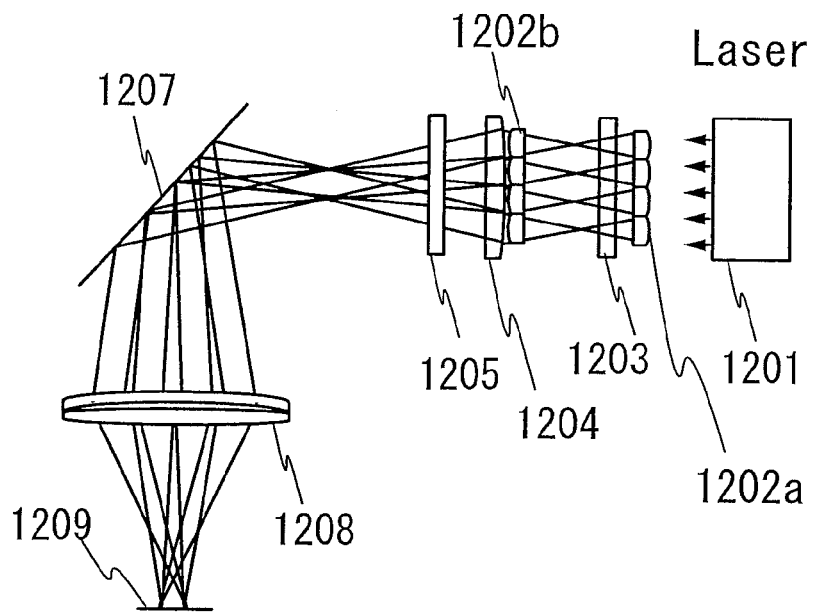
FIGS. 6A and 6B are drawings showing the conventional beam homogenizer.
Figure 6B:
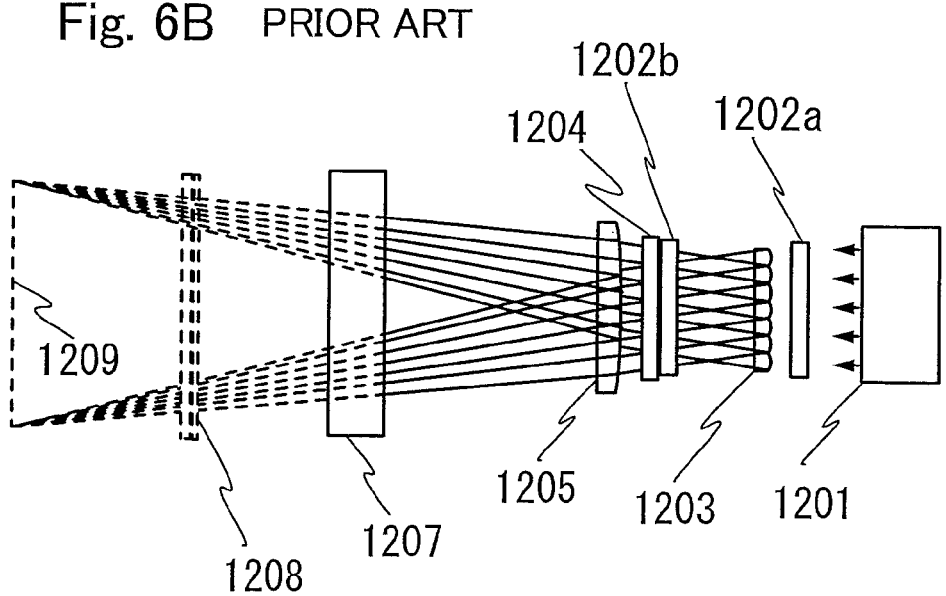

The optical system including the optical waveguide shown in FIGS. 3A and 3B can form a rectangular beam spot having a size of 300 mm in major axis, and 0.4 mm in minor axis and having homogeneous energy distribution. FIGS. 4A to 4C show the simulation result by an optical design software. FIG. 4A is a chart to show the energy distribution of the beam spot formed on the plane having a size of ±0.3 mm in the direction of the minor axis and ±200 mm in the direction of the major axis from the center of the rectangular beam spot. FIGS. 4B and 4C show cross sections of the beam spot taken along a line A and a line B in FIG. 4A respectively. A vertical axis shows the laser intensity (A.U.), and a horizontal axis shows the length (mm). In FIG. 4A, the beam spot has the shape that is extremely similar to a rectangle, and the line width of the beam spot is uniform over the length of 300 mm. This promises uniform annealing by the laser irradiation.

The laser annealing is performed to the semiconductor film with the optical system including the optical waveguide shown in this embodiment with the method according to the embodiment mode, for example. The semiconductor film can be used to manufacture an active matrix liquid crystal display device for example. A practitioner may manufacture this device according to a known method.

[Embodiment 2]

This embodiment shows an example of the different optical system from that described in the embodiment mode. FIGS. 5A and 5B show the example of the optical system to be explained in this embodiment. In addition, a light pipe can be used as the optical waveguide. In addition, in FIGS. 5A and 5B, the same part as that in FIGS. 3A and 3B is shown with the same reference numeral.

In FIGS. 5A and 5B, the laser beam goes through the same optical path as that shown in FIGS. 3A and 3B except when the laser beam goes through the optical waveguides 504 and 507. Each of the optical waveguides 504 and 507 has a pair of reflection planes provided oppositely as well as the optical waveguide 304. The optical waveguide 304 has a hollow space between the pair of reflection planes. On the other hand, the optical waveguides 504 and 507 have the space filled with the medium having a refractive index of "n" (>1). This is the different point between these optical waveguides. When the laser beam is incident into the optical waveguides 504 and 507 at a critical angle or more, the laser beam is all reflected on the reflection plane according to the same principle as the optical fiber. For example, when the optical waveguide made of quartz (refractive index is approximately 1.5) is arranged in the air, it is possible to obtain the optical waveguide having all reflection planes in the interface between the air and the optical waveguide. With the optical waveguide as above employed, the transmittance of the laser beam becomes considerably higher compared to the case when the laser beam is not all reflected. Thus, the laser beam emitted from the laser oscillator 301 is propagated to the surface to be irradiated 309 more effectively.

In addition, an optical waveguide of a multilayer structure may be used instead of the optical waveguides 504 and 507 in FIGS. 5A and 5B. Typically, an optical waveguide made of two materials as shown in FIG. 7A, in which an inner material 702 (a quartz including germanium, for example) has a higher refractive index than an outer material 701 (a quartz, for example) can be used.

Figure 7A:
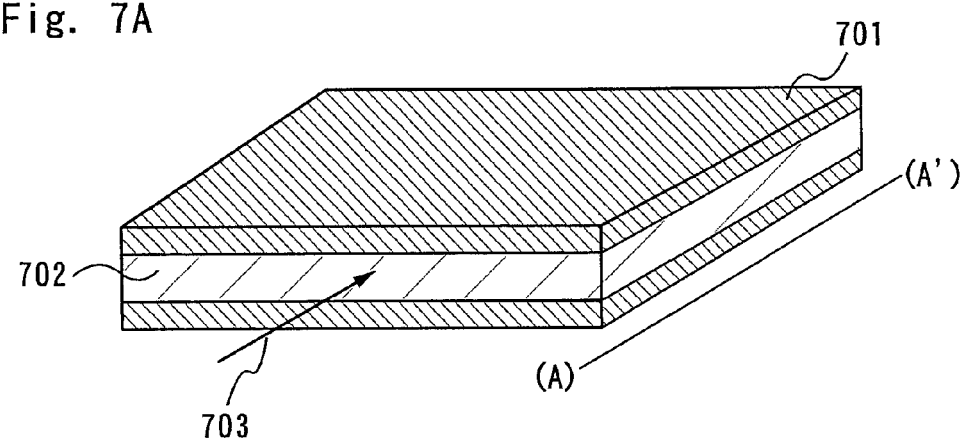
FIGS. 7A to 7C are drawings showing an example of the optical waveguide disclosed in the present invention.
Figure 7B:
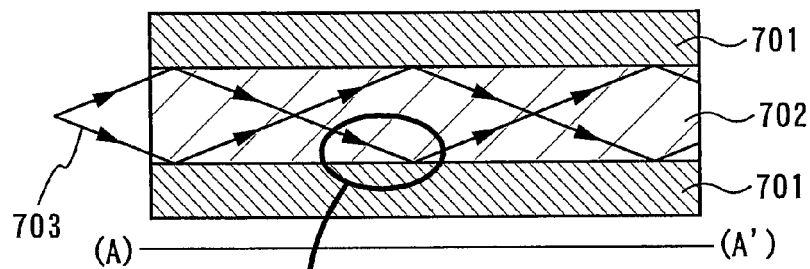
Figure 7C:
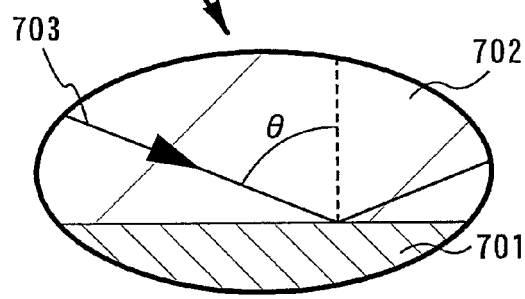

FIG. 7B is a cross-sectional view taken along a line (A)-(A') in the optical waveguide shown in FIG. 7A. In addition, FIG. 7C is an enlarged view of the reflection plane in FIG. 7B. When the laser beam is incident into the optical waveguide at an incidence angle $\theta$ not less than the critical angle $\theta_0$, the incident laser beam is all reflected between the reflection planes provided oppositely.

In addition, the entrance surface of the optical waveguide 504 and 507 may be appropriately coated in order to reduce the reflectivity of the laser beam at the entrance surface of the optical waveguide when the laser beam is incident into the optical waveguides 504 and 507.

The optical system shown in FIGS. 5A and 5B can form a rectangular beam spot having a size of 300 mm in its major axis and 0.4 mm in its minor axis.

The laser annealing is performed to the semiconductor film using the optical system shown in this embodiment with the method according to the embodiment mode, for example. The semiconductor film can be used to manufacture an active matrix liquid crystal display device or a light-emitting device for example. A practitioner may manufacture the device according to a known method.

What is claimed is:

1. A method for manufacturing a semiconductor device comprising:
   providing a laser beam having a linear shape;
   homogenizing energy distribution of the laser beam in a minor axis direction of the linear shape;
   homogenizing energy distribution of the laser beam in a major axis direction of the linear shape by an optical waveguide;
   forming a semiconductor film over a substrate; and
   irradiating the semiconductor film with a homogenized laser beam by moving at least one of the semiconductor film and the homogenized laser beam,
   wherein the optical waveguide has a multilayer structure in which an inner material has a higher refractive index than an outer material.

2. The method for manufacturing a semiconductor device according to claim 1, wherein the optical waveguide is a light pipe.

3. The method for manufacturing a semiconductor device according to claim 1, wherein the laser beam is emitted from a laser oscillator selected from the group consisting of an excimer laser, a YAG laser, a glass laser, a $YVO_4$ laser, a $GdVO_4$ laser, a YLF laser, and an Ar laser.

4. The method for manufacturing a semiconductor device according to claim 1, wherein the step of homogenizing energy distribution of the laser beam in the minor axis direction of the linear shape is performed by a lens array.

5. The method for manufacturing a semiconductor device according to claim 1, wherein the semiconductor film comprises silicon.

6. The method for manufacturing a semiconductor device according to claim 1, wherein the outer material comprises quartz.

7. The method for manufacturing a semiconductor device according to claim 1, wherein the inner material comprises quartz and germanium.

8. A method for manufacturing a semiconductor device comprising:
   providing a laser beam having a linear shape;
   homogenizing energy distribution of the laser beam in a minor axis direction of the linear shape by a first optical waveguide;
   homogenizing energy distribution of the laser beam in a major axis direction of the linear shape by a second optical waveguide;
   forming a semiconductor film over a substrate; and
   irradiating the semiconductor film with a homogenized laser beam by moving at least one of the semiconductor film and the homogenized laser beam,
   wherein at least one of the first and second optical waveguides has a multilayer structure in which an inner material has a higher refractive index than an outer material.

9. The method for manufacturing a semiconductor device according to claim 8, wherein each of the first and second optical waveguides comprises a light pipe.

10. The method for manufacturing a semiconductor device according to claim 8, wherein the laser beam is emitted from a laser oscillator selected from the group consisting of an excimer laser, a YAG laser, a glass laser, a YVO$_4$ laser, a GdVO$_4$ laser, a YLF laser, and an Ar laser.

11. The method for manufacturing a semiconductor device according to claim 8, wherein the semiconductor film comprises silicon.

12. The method for manufacturing a semiconductor device according to claim 8, wherein the outer material comprises quartz.

13. The method for manufacturing a semiconductor device according to claim 8, wherein the inner material comprises quartz and germanium.

14. A method for manufacturing a semiconductor device comprising:
    emitting a laser beam from a laser oscillator;
    shaping the laser beam into a linear shape by a first lens;
    homogenizing energy distribution of the laser beam in a minor axis direction of the linear shape by a lens array and a second lens;
    homogenizing energy distribution of the laser beam in a major axis direction of the linear shape by an optical waveguide;
    forming a semiconductor film over a substrate; and
    irradiating the semiconductor film with a homogenized laser beam,
    wherein the optical waveguide has a multilayer structure in which an inner material has a higher refractive index than an outer material.

15. The method for manufacturing a semiconductor device according to claim 14, wherein the optical waveguide is a light pipe.

16. The method for manufacturing a semiconductor device according to claim 14, wherein the laser oscillator is one selected from the group consisting of an excimer laser, a YAG laser, a glass laser, a YVO$_4$ laser, a GdVO$_4$ laser, a YLF laser, and an Ar laser.

17. The method for manufacturing a semiconductor device according to claim 14, wherein the step of irradiating is performed by moving at least one of the semiconductor film and the homogenized laser beam.

18. The method for manufacturing a semiconductor device according to claim 14, wherein the outer material comprises quartz.

19. The method for manufacturing a semiconductor device according to claim 14, wherein the inner material comprises quartz and germanium.

20. The method for manufacturing a semiconductor device according to claim 14, wherein the first lens is a cylindrical lens.

21. The method for manufacturing a semiconductor device according to claim 14, wherein the lens array is a cylindrical lens array.

22. The method for manufacturing a semiconductor device according to claim 14, wherein the second lens is a cylindrical lens.

23. A method for manufacturing a semiconductor device comprising:
    emitting a laser beam from a laser oscillator;
    shaping the laser beam into a linear shape;
    homogenizing energy distribution of the laser beam in a minor axis direction of the linear shape by a first optical waveguide;
    homogenizing energy distribution of the laser beam in a major axis direction of the linear shape by a second optical waveguide;
    forming a semiconductor film over a substrate; and
    irradiating the semiconductor film with a homogenized laser beam,
    wherein at least one of the first and second optical waveguides has a multilayer structure in which an inner material has a higher refractive index than an outer material.

24. The method for manufacturing a semiconductor device according to claim 23, wherein each of the first and second optical waveguides is a light pipe.

25. The method for manufacturing a semiconductor device according to claim 23, wherein the laser oscillator is selected from the group consisting of an excimer laser, a YAG laser, a glass laser, a YVO$_4$ laser, a GdVO$_4$ laser, a YLF laser, and an Ar laser.

26. The method for manufacturing a semiconductor device according to claim 23, wherein the step of shaping is performed by a lens.

27. The method for manufacturing a semiconductor device according to claim 23, wherein the step of shaping is performed by a beam expander.

28. The method for manufacturing a semiconductor device according to claim 23, wherein the step of irradiating is performed by moving at least one of the semiconductor film and the homogenized laser beam.

29. The method for manufacturing a semiconductor device according to claim 23, wherein the outer material comprises quartz.

30. The method for manufacturing a semiconductor device according to claim 23, wherein the inner material comprises quartz and germanium.

* * * * *